Dec. 7, 1954    G. W. C. ALLAN ET AL    2,696,019
MEANS FOR THE PRODUCTION OF AGGLOMERATES
FROM FINE MATERIAL SUCH AS FINE COAL
Filed July 14, 1952    2 Sheets-Sheet 1
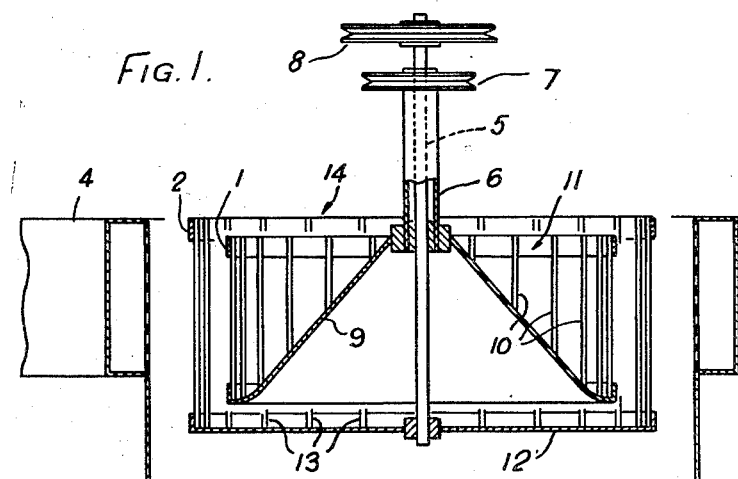
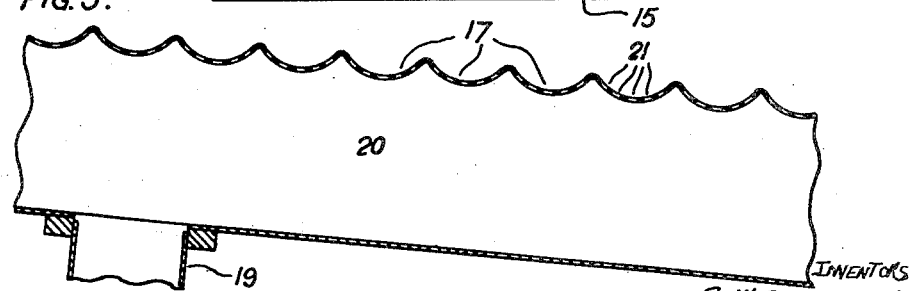
INVENTORS
G. W. C. ALLAN
W. E. DALE
G. A. SPARHAM
R. L. BROWN
Wilkinson & Mawhinney ATTYS

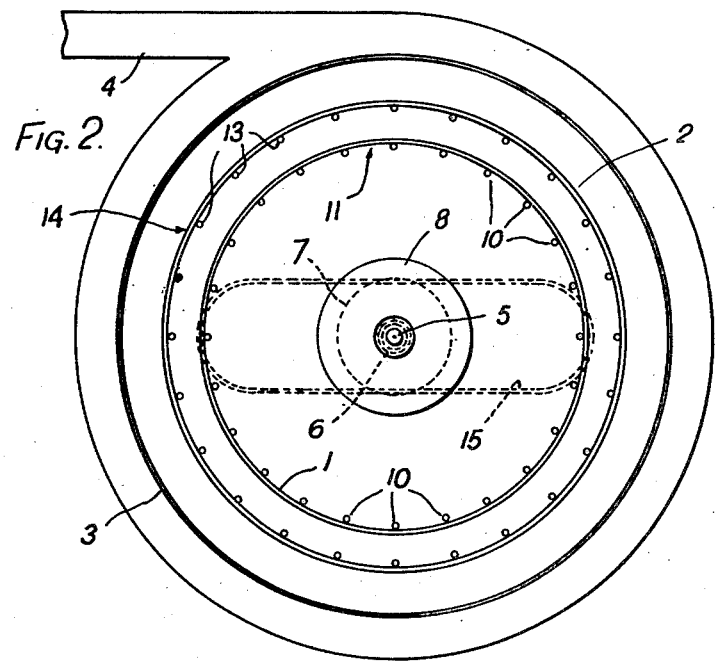
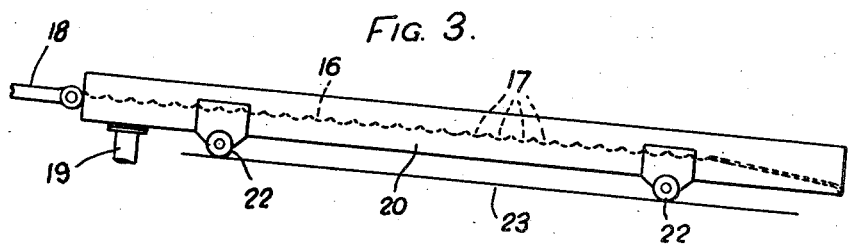
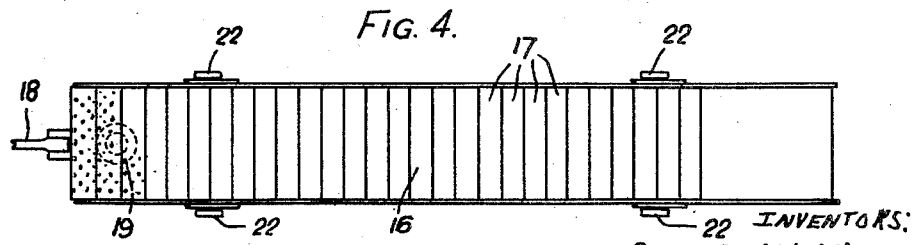

United States Patent Office 2,696,019
Patented Dec. 7, 1954

2,696,019

MEANS FOR THE PRODUCTION OF AGGLOMERATES FROM FINE MATERIAL SUCH AS FINE COAL

George William Crawford Allan, Worcester Park, Wilfred Eric Dale, New Malden, George Albert Sparham, Ashtead, and Robert Leslie Brown, London, England, assignors to C. U. R. A. Patents Limited, Leatherhead, England Application July 14, 1952, Serial No. 298,723

Claims priority, application Great Britain July 19, 1951

1 Claim. (Cl. 18—1)

This invention relates to improved methods of agglomeration or pelleting of fine material, such as fine coal, in the form of a moist slurry, and to improved means for carrying the agglomeration into effect.

It has previously been proposed to shape fine material in the form of moist irregular lumps into more uniform agglomerates, followed by drying. A revolving drum has been proposed for the agglomeration operation. The object, in previous processes, appears to have been the elimination or reduction of the fines content of the dried material without any particular attention being paid to an upper size limit.

However in the case, for example, of material intended for combustion, it is a requirement to observe both an upper and a lower size tolerance, for the reason that when fed to the grate of an industrial burning appliance or into a gas producer, oversize particles have been found to go through incompletely consumed, with unburnt carbon in the core of the particle. A suitable size grading of dried coal fines agglomerates for boiler fuel, for example, is 1/8–1/2 inch diameter.

By the method and means of the present invention this requirement is satisfied in an advantageous manner.

The invention provides a process for the production of agglomerates, wherein a slurry of fine material, in the form of coherent moist lumps, is subjected to a disintegration operation with the production of small aggregates of moist particles and these small aggregates are subjected to an oscillatory motion having a component in a horizontal direction and the larger agglomerates thereby produced are caused, by the said motion, to progress through a plurality of parallel trough-like zones whose individual axes are located perpendicular to the direction of movement of the particles.

Progress of the agglomerates through the trough-like zones is preferably in a general direction downwards at a slight angle to the horizontal and the direction of oscillation is preferably substantially parallel to the said direction.

For purposes to be described below, it is of advantage to subject the agglomerates to a current of air during the agglomeration process.

The moist agglomerated material will normally be subsequently dried by heat.

In a preferred form of the process distintegration of the moist lumps of slurry is effected by projection thereof at a grid which is being moved across the path of projection of the slurry, whereby the slurry is disintegrated by the grid and passes through it, and the speed of movement of the small aggregates produced is then checked in order to avoid such impact with a collecting surface as would cause too great a proportion of the small aggregates to stick thereto and to be built up in masses thereon.

The checking of the speed of the disintegrated moist aggregates may be effected by means of a second similar grid moving at a slower speed across the path of the particles and preferably in the opposite direction.

According to a further feature of the invention sticking of the disintegrated moist aggregates to a collecting surface may be further reduced by partial drying of these aggregates, for example by means of a warm air current. Alternatively the collecting surface may be periodically scraped by the use of scrapers.

For disintegration, the material should be in the form of a thick mud whose particles shown some mutually cohesive properties, the magnitude of such cohesive forces being that associated with loamy soil, river mud or moulding sand, as used in foundries. In the case of colliery slurry in which, like most such materials, the required consistency varies with moisture content, a moisture content of from 20%–25% is known from experiment to give a suitable material. It is not desirable that such moisture content be appreciably higher as otherwise the mud deforms too readily, or even flows, nor must it be appreciably lower as otherwise it would be unsuitable for agglomeration. Coal slurry, for example, occurs in the form of loosely bound irregular shaped lumps of varying size from a maximum dimension of about 10 in. downwards. In the case of froth-flotated coal fines of low ash content, the corresponding desirable moisture content for disintegration has been found to be from 25% to 30%. The small moist aggregates produced by disintegration will usually very in size about a mean corresponding approximately to a minimum size which it is desired to accept in the final pelleted material, such as fuel. If this minimum is about 1/8 inch, the small aggregates may vary between 1/16 and 3/16 inch.

It is found that agglomeration by the oscillation method of the present invention appears to take place in two main stages. In the first of these the more or less uneven aggregates produced by disintegration coalesce into likewise uneven agglomerates. In the second stage it appears that the agglomerates have more or less ceased to grow by coalescence but, due to their progress, become gradually rounded off by impact.

The effect of a current of air in the agglomeration may be to cause a very mild drying necessary to prevent further coalescence and to allow rounding off to take place. This imports an element of control into the agglomeration operation. An air current from beneath may also prevent sticking of the agglomerates to their supporting surface by simple lifting of the agglomerates from the same.

The invention also relates to apparatus for carrying out the disintegration and agglomeration operations.

Such apparatus may include a disintegrator comprising an inner cylindrical basket, the curved side of which is in the form of a grid of spaced cutting members, for example wires, preferably arranged parallel to the axis of the cylinder, means for rotating the basket about this axis, which is preferably vertical or inclined to the vertical, an outer cylindrical basket, the curved side of which is of similar construction to that of the inner basket, means for rotating said outer basket about the same axis as the inner basket but at a slower speed and a collecting surface for disintegrated material.

The bottom of the inner basket is preferably in the form of an upright continuous cone. The collecting surface may be a cylindrical casing coaxial with the baskets, which casing is reduced at the base to a slot suitable for delivery of disintegrated material to a tray. The casing may comprise means for the introduciton of a current of gas, such as air.

The apparatus according to the invention may also include an agglomeration device comprising a tray having a plurality of parallel grooves for supporting disintegrated material to be agglomerated and means for imparting to the tray an oscillating movement having a component in a horizontal direction perpendicular to the direction of the grooves.

The tray is preferably inclined downwards at a slight angle to the horizontal, for example 5–7°, and the device is preferably adapted for oscillation of the tray in a direction parallel thereto.

The process as described with the application of a drying gas may be carried out by the use of an agglomeration device in which the tray is provided with a plurality of perforations which are small relative to the size of aggregates to be processed upon it and in which the tray is adapted for the passage of a gas upwards through the said perforations.

The apparatus of the invention is illustrated diagrammatically in the accompanying drawing in which:

Fig. 1 is a sectional elevation of a disintegrator and

Fig. 2 is a cross section thereof, while

Fig. 3 is a sectional elevation of an agglomeration device,

Fig. 4 is a plan view thereof and

Fig. 5 is a detailed view of Fig. 3 showing perforations in the tray.

Referring to Figs. 1 and 2, 1 is an inner cylindrical basket, 2 an outer cylindrical basket, 3 a collecting casing and 4 an outer casing of volute shape. Both baskets are adapted to rotate about vertical axis A, basket 2 on a spindle 5 and basket 1 on a sleeve 6 mounted in ball bearings on the said spindle. The drives to the baskets are through the pulleys 7 and 8 respectively.

The basket 1 has an upright conical continuous bottom 9 and the curved side thereof consists of a grid of spaced cutting wires 10 with an upper rim 11. The basket 2 has a flat bottom 12 and the curved side thereof likewise consists of a grid of spaced wires 13 with an upper rim 14.

The casing 3 is reduced at the base to a slot 15.

Referring to Figs. 3, 4, and 5, 16 is a tray having a plurality of transverse grooves 17. The tray is inclined downwards at a slight angle to the horizontal. A rod 18 is for imparting an oscillating movement to the tray in a direction parallel thereto from a source not illustrated. A duct 19 serves for the supply of air to a manifold chamber 20 from which it passes upward through perforations 21. The tray is supported by wheels 22 and a track 23.

In carrying out the disintegration process of the invention by the use of the apparatus described with reference to Figs. 1 and 2, the baskets are rotated, preferably in opposite directions, the outer basket at the slower speed and lumps of moist slurry are introduced into the inner basket. The variables are the nature and moisture content of the slurry and the speeds of the two baskets. As explained above, a slurry of a particular nature has an optimum range of moisture content to allow of processing by means of this apparatus and for a particular moisture content within this range there are optimum speeds of the two baskets for producing moist aggregates of the required size which do not stick excessively to the sides of the collecting chamber. Determination of the overall optimum conditions is a matter for experiment in each individual case. Reduction of the moisture content of a slurry to that required for the present process may be carried out by centrifuging or vacuum filtration. In some cases water may have to be added.

The material to be broken up can be handled satisfactorily by merely dropping it into the inner basket where it slides down the conical shaped base and strikes the wires, but better results are obtained by projecting the feed with an appreciable velocity, e. g. by a throwing shovel of the type of that of a sprinkler stoker. The material after being broken up by the cutting bars of the inner basket, encounters the bars of the outer basket which rotates coaxially, the purpose of which outer basket is partly to effect further size reduction but mainly to reduce the velocity of the small mud aggregates, so that their tendency to adhere to the walls of the casing by collision is reduced. It has been found by experiment that the best speed of the outer basket for this purpose is about one-fifth of that of the inner basket, and that it should be run in the opposite direction. Higher speeds of the outer basket give higher particle exit velocities and lower speeds thereof, without showing much reduction of the exit velocity, tend to allow of accumulation of material in and around the cutter bars. It has been shown that at all speeds in either direction below one half that of the inner basket a great reduction of particle velocity was effected as compared with an apparatus having no outer basket.

The cutting bars on both baskets are of such a section that they can break up the material as fed into small pieces with a minimum of deformation. It has been observed that a property of the sticky, wet muds described is that when deformed, a very thin moisture film always appears at the surface, as compared with the deformation, say of clean sand where a deformation causes moisture to disappear from the surface (as when one walks on the sand on a seashore).

The above apparatus comprises means for introducing a warm air blast into the collecting casing in a tangential direction causing circulation within said casing, for the purpose set forth above.

In carrying out the agglomeration process of the invention by the use of the apparatus described with reference to Figs. 3 to 5, disintegrated moist slurry aggregates are introduced on to the higher end of the tray while the latter is in oscillation. The material agglomerates and gradually travels across the grooves to the lower end of the tray, where it may be delivered to a suitable support for a subsequent drying operation.

The following example illustrates the invention:

*Example*

A disintegrator as described above had an inner basket of 8 in. diameter having a curved side consisting of 50 vertical 16 S. W. G. carbon steel wires 2¾ effective inches long spaced equidistantly apart. Around said inner basket was a co-axial outer basket of about 10 in. diameter with a flat bottom and with a side of similar construction to that of the inner basket and extending to about the same upper level. The outer basket had 63 bars of 16 S. W. G. carbon steel wire 3 effective inches long.

Around the baskets, at a distance of about 2 in. from the outer, was the vertical cylindrical collecting casing reduced at the base to a slot.

The inner basket was rotated at 1000 R. P. M. and slurry from the Bedlington Washery, adjusted to 25% moisture content, was fed into it in the form of broken lumps. The outer basket was rotating at 250–300 R. P. M. in the opposite direction.

After leaving the outer basket, the disintegrated material (mostly rough in shape and about ⅛ in. to 1/16 in. maximum dimension) fell downward inside the casing. This casing was provided with louvres shaped so as to guide inwards a current of air supplied in a direction roughly tangential to the casing wall. The air was led in from the outer casing 4. The purpose of this air is to prevent a slow build up through occasional particles which avoid the outer basket or would otherwise meet the casing with sufficient velocity to adhere thereto. The air louvres are placed so as to meet the bulk of the particles as they move outwards from the outer basket and sticking is prevented partly by carrying off the particles in the air stream and partly by drying off the thin moisture film mentioned above. As an alternative to the use of this air current, a mechanical scraper could be employed.

The disintegrated slurry was delivered from the slot in the collecting casing in the form of moist aggregates of a degree of uniformity suitable for reception on the oscillating tray of Figs. 3–5.

The size of the small moist aggregates produced on disintegration can be deduced from the following data. A test portion of the aggregates as delivered from the slot was received in a shallow pan, dried at 100° C. and graded. The dried product was of the following grading:

| | Per cent |
|---|---|
| Over B. S. S. 8 | 14 |
| Over B. S. S. 8–16 | 42 |
| Over B. S. S. 16–30 | 19 |
| Below B. S. S. 30 | 25 |

The tray used in the agglomeration stage was 11½ inches wide at the grooves and 5 ft. 5 inches long. The grooves themselves, in cross section, gave arcs of ⅝ inch radius. The tray was oscillated at 220–250 cycles per minute. The majority of the agglomerates produced were ¼ to ½ inch in diameter.

On drying, the agglomerates provided a combustible product eminently suitable for use under boilers or for gas-producers.

The apparatus, as described, is capable of operation with a throughput of one ton per hour of slurry of moisture content adjusted as specified.

We claim:

An agglomeration device for moist disintegrated slurry, comprising a tray having a plurality of transverse parallel grooves, for supporting disintegrated slurry to be agglomerated, said tray being provided with a plurality of perforations which are small relative to the size of said disintegrated slurry, means for imparting to said tray an oscillating movement having a component in a horizontal direction perpendicular to the direction of the grooves and means for the passage of gas upwards through the said perforations.

References Cited in the file of this patent

UNITED STATES PATENTS

| Number | Name | Date |
|---|---|---|
| 1,482,607 | Gow | Feb. 5, 1924 |
| 1,892,074 | Nielsen | Dec. 27, 1932 |
| 1,980,130 | Fasting | Nov. 6, 1934 |
| 1,990,765 | Wettlaufer | Feb. 12, 1935 |
| 2,211,570 | Kennedy et al. | Aug. 13, 1940 |
| 2,222,777 | Linke | Nov. 26, 1940 |
| 2,246,902 | Smith | June 24, 1941 |
| 2,553,714 | Lucas | May 22, 1951 |

FOREIGN PATENTS

| Number | Country | Date |
|---|---|---|
| 693,143 | Germany | July 3, 1940 |